United States Patent
Lembcke

(10) Patent No.: US 10,033,664 B2
(45) Date of Patent: Jul. 24, 2018

(54) ETHERNET SWITCH AND METHOD FOR ESTABLISHING FORWARDING PATTERNS IN AN ETHERNET SWITCH

(71) Applicant: Airbus Operations GmbH, Hamburg (DE)

(72) Inventor: Ralph Lembcke, Buchholz (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 382 days.

(21) Appl. No.: 14/668,493

(22) Filed: Mar. 25, 2015

(65) Prior Publication Data
US 2015/0281130 A1 Oct. 1, 2015

(30) Foreign Application Priority Data

Mar. 28, 2014 (EP) ..................................... 14162415

(51) Int. Cl.
| | |
|---|---|
| *H04L 12/935* | (2013.01) |
| *H04L 5/14* | (2006.01) |
| *H04L 12/933* | (2013.01) |
| *H04L 12/931* | (2013.01) |
| *H04L 12/54* | (2013.01) |
| *H04L 12/64* | (2006.01) |

(52) U.S. Cl.
CPC ............ *H04L 49/3009* (2013.01); *H04L 5/14* (2013.01); *H04L 49/15* (2013.01); *H04L 49/351* (2013.01); *H04L 12/56* (2013.01); *H04L 12/6418* (2013.01)

(58) Field of Classification Search
None
See application file for complete search history.

(56) References Cited

U.S. PATENT DOCUMENTS

| | | |
|---|---|---|
| 2005/0100011 A1 | 5/2005 | Chiruvolu et al. |
| 2008/0043768 A1* | 2/2008 | Lopez ................ H04L 12/5693 370/412 |
| 2011/0103391 A1 | 5/2011 | Davis et al. |
| 2013/0022040 A1 | 1/2013 | Davis et al. |
| 2013/0044587 A1 | 2/2013 | Davis et al. |
| 2013/0089104 A1 | 4/2013 | Davis et al. |
| 2013/0094499 A1 | 4/2013 | Davis et al. |
| 2013/0097351 A1 | 4/2013 | Davis et al. |
| 2013/0097448 A1 | 4/2013 | Davis et al. |

(Continued)

FOREIGN PATENT DOCUMENTS

| | | |
|---|---|---|
| EP | 1530328 | 5/2005 |
| EP | 2629459 | 8/2013 |
| WO | 2011053488 | 5/2011 |

OTHER PUBLICATIONS

European Search Report, dated Oct. 10, 2014.

*Primary Examiner* — Vinncelas Louis
(74) *Attorney, Agent, or Firm* — Greer, Burns & Crain, Ltd.

(57) ABSTRACT

An Ethernet switch includes at least two interconnected Ethernet switch modules, with each of the Ethernet switch modules having a number of ingress/egress ports configured to receive or output Ethernet packets from and to end systems and interconnected Ethernet switch modules, and a forwarding function configured to modify a packet header of received Ethernet packets by encoding the identity of the ingress port at which the respective Ethernet packet has been received in identification bits of the packet header.

8 Claims, 3 Drawing Sheets

(56) References Cited

U.S. PATENT DOCUMENTS

2013/0208630 A1 8/2013 Bobrek
2013/0259047 A1* 10/2013 Bhagavathiperumal
................................. H04L 12/6418
370/392

* cited by examiner

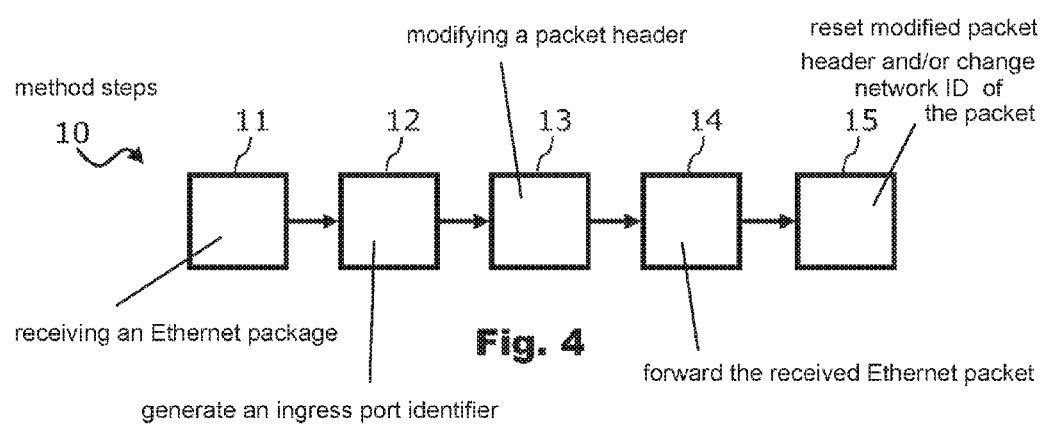

ETHERNET SWITCH AND METHOD FOR ESTABLISHING FORWARDING PATTERNS IN AN ETHERNET SWITCH

CROSS-REFERENCES TO RELATED APPLICATIONS

This application claims the benefit of the European patent application No. 14162415.5 filed on Mar. 28, 2014, the entire disclosures of which are incorporated herein by way of reference.

FIELD OF THE INVENTION

The present invention relates to an Ethernet switch, in particular an Avionics Full-Duplex Switched Ethernet (AFDX™) Ethernet switch, and a method for establishing forwarding patterns in an Ethernet switch, in particular for AFDX virtual link packet forwarding.

BACKGROUND OF THE INVENTION

Avionics Full-Duplex Switched Ethernet (AFDX™) Ethernet switch networks utilize dedicated bandwidths while providing deterministic quality of service (QoS). The AFDX Ethernet switch standard is the Part 7 of the ARINC-664 "Aircraft Data Network" standard. It describes a deterministic switched Ethernet/IP network, that is, a switched network where a few constraints are applied. These constraints determine the allocated data transmission rate and the maximum packet or packet forwarding latency. AFDX networks are switched Ethernet local networks which employ data transmission in the form of IP packets encapsulated in Ethernet packets.

In a switched Ethernet network, each end device is connected to a switch via an individual physical link. In a network topology that contains more than one switch there will also be physical links between the different switches. A common setup for a switch is therefore to provide multiple ports that are used to establish physical links with other switches and with end devices. These physical links are operated in full duplex, i.e., each port at the switches as well as at the end devices can simultaneously send packets out onto the network and receive packets from the network. An egress port is the portion of a port that provides the functionality to send out packets onto the network, an ingress port is the portion of a port that provides the functionality to receive packets from the network.

The end devices may be producers, consumers, or both, producers and consumers of data packets. In an AFDX network, packets produced by one sourcing end device may be forwarded to exactly one destination end device only, but in typical scenarios packets produced by one sourcing end device will be forwarded to several destination end devices in parallel. Each destination end device will be delivered with a copy of the packet originally sent by the sourcing end device. These copies will be generated by the switches along the path through the network between the source end device and the destination end devices.

A virtual link is the set union of all physical links within the AFDX network that are used to transport the packets originating from the respective sourcing end device to all the assigned destination end devices. To unambiguously identify virtual links, each virtual link is assigned a virtual link identification number, abbreviated virtual link ID or VLID. Virtual links in the AFDX Ethernet network standard consist therefore of unidirectional multicast communication channels, whereby the VLID forms part of the multicast Ethernet MAC address and the multicast IP address used in the packet headers. In an AFDX network there are typically multiple virtual links present, whereby each end system may be the source of one or many virtual links and each virtual link may have a different set of receiving end systems.

A virtual link is implemented in an AFDX network by configuring the switches with respective forwarding rules. A forwarding table is the set of all rules that are configured on a certain switch. To configure one or several virtual links in an AFDX network subsequently requires the generation of a respective forwarding tables for each switch in the network.

AFDX Ethernet switches receiving a packet at an ingress port will read the VLID from the multicast destination MAC address found in the Ethernet packet header and will use this VLID to look-up in their forwarding table the set of egress ports to which the received packet shall be copied to and sent out from. The document US 2008/0043768 A1 for example discloses such a switch for an AFDX network.

In an AFDX network as intended by the ARINC-664 "Aircraft Data Network" standard each virtual link may only emanate from one sourcing end device in the whole network but may terminate at a number of receiving end devices. In testing environments incorporating AFDX networks, test system components are mixed with original equipment units under test. In order to keep a well-defined testing scenario, the test system components simulating real system components should use the same virtual link definitions including the same virtual link identifiers as the real system components. In testing environments, it should be possible to modify the payload of VLs, that is to receive VLs from one or several switches with test system components, to apply the modifications by use of the test system components, and to send the modified VLs again out onto the AFDX network using the same VLIDs. To save on testing environment costs, it should be possible to multiplex several distinct VLs having the same VLIDs onto the same physical links and being able to correctly de-multiplex them later on again. In large integration testing environments, it is desirable to be able to configure the testing environment's AFDX network such that the overall pool of resources can be used to conduct an all-encompassing large integration test as well as to simultaneously conduct multiple independent smaller-scaled tests without having to disconnect or rearrange the network's physical links, i.e., without having to change the physical wiring.

It is thus desirable to be able to forward two or more distinct VLs having the same VLID within an AFDX Ethernet switch utilizing the same ingress and egress ports and thus the same physical network links, and yet be able to distinguish between the different VLs within the switches. It is thus also desirable to be able to apply different forwarding rules in an AFDX Ethernet switch for the same VLIDs, dependent on the ingress ports through which the VLs are received.

SUMMARY OF THE INVENTION

One idea of the invention is thus to provide solutions for integration tests in switched Ethernet networks that allow for establishing forwarding patterns which discern between test system components and original equipment units.

A first aspect of the disclosure pertains to an Ethernet switch, comprising at least two interconnected Ethernet switch modules, with each of the Ethernet switch modules comprising a number of ingress/egress ports configured to receive or output Ethernet packets from and to end systems and interconnected Ethernet switch modules, and a forwarding function configured to modify a packet header of received Ethernet packets by encoding the identity of the ingress port at which the respective Ethernet packet has been received in identification bits of the packet header.

A main idea of the Ethernet switch is to provide a forwarding table that allows the configuration of egress ports as a function of the destination MAC address, the additional identification bits and the ingress port through which the packet was received.

According to a second aspect of the disclosure, a method is provided for establishing forwarding patterns in an Ethernet switch, the Ethernet switch comprising at least two interconnected Ethernet switch modules. The method comprises receiving an Ethernet packet from an end system at an ingress port of one of the Ethernet switch modules, generating an ingress port identifier depending on the ingress port at which the Ethernet packet has been received, modifying a packet header of the received Ethernet packet by encoding the ingress port identifier of the ingress port at which the Ethernet frame has been received in identification bits of the frame header, forwarding the received Ethernet packet through the Ethernet switch, and resetting the modified frame header to the original content of the received Ethernet frame upon outputting the received Ethernet packet at an egress port of one of the Ethernet switch modules.

According to a third aspect of the disclosure, a non-transitory computer-readable medium comprising computer-readable instructions which, when executed on a computer, cause the computer to perform a method according to the second aspect of the disclosure.

According to an embodiment of the Ethernet switch, the Ethernet switch may comprise an Avionics Full-Duplex Switched Ethernet, AFDX™, Ethernet switch, and the Ethernet packets may comprise AFDX packets.

According to a further embodiment of the Ethernet switch, the forwarding function may be configured to modify a destination MAC address field or a source MAC address field of the Ethernet packets.

According to a further embodiment of the Ethernet switch, the forwarding function may be further configured to reset the identification bits of the frame header to the original values of the received Ethernet packets, when the Ethernet packets are output at an egress port.

According to a further embodiment of the Ethernet switch, the packet header of the AFDX frames may comprise a virtual link identifier of an AFDX virtual link which the respective Ethernet packet belongs to.

According to a further embodiment of the Ethernet switch, the end systems may comprise line replaceable units, LRUs, and test environment components such as simulation model execution hosts, physical signal input/output modules and/or data display tools.

According to an embodiment of the method, the Ethernet switch may comprise an Avionics Full-Duplex Switched Ethernet, AFDX™, Ethernet switch, and the Ethernet packets may comprise AFDX packets.

According to a further embodiment of the method, modifying the packet header of the received Ethernet packet may comprise modifying a destination MAC address field or a source MAC address field of the Ethernet packet.

According to a further embodiment of the method, resetting the modified packet header may comprise resetting the identification bits of the packet header to the original values of the received Ethernet packet, before the Ethernet packet is output at an egress port.

According to a further embodiment of the method, routing the received Ethernet packet through the Ethernet switch may be dependent on a virtual link identifier of an AFDX virtual link which the respective Ethernet packet belongs to which virtual link identifier is included in the packet header of the Ethernet packet.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 4 schematically illustrates a method for establishing forwarding patterns in an Ethernet switch.

DETAILED DESCRIPTION OF THE PREFERRED EMBODIMENTS

Figure 1:
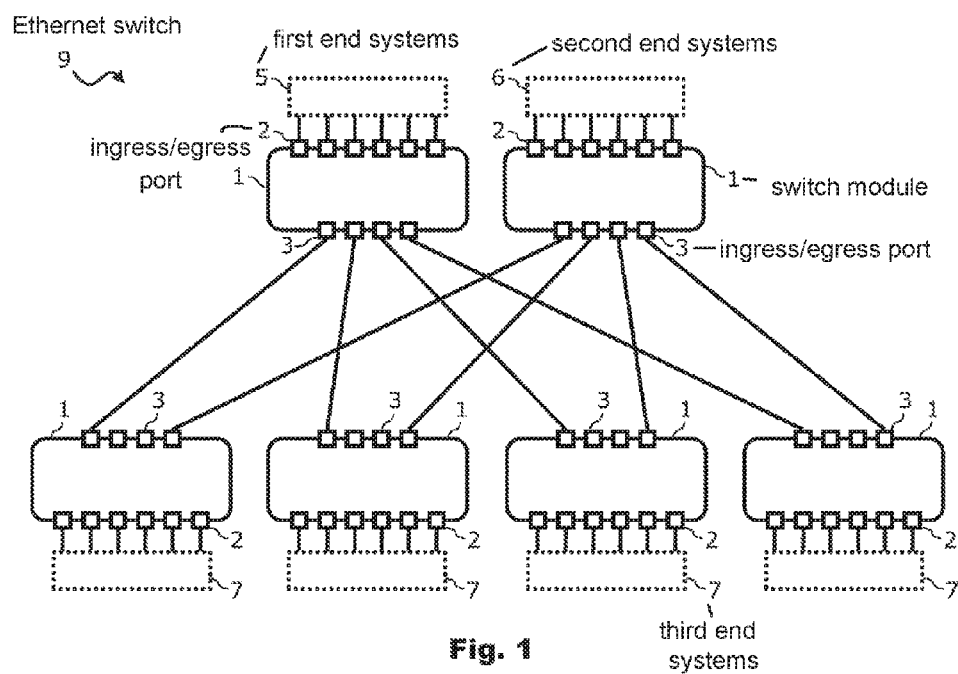
FIG. 1 schematically illustrates an Ethernet switch having a plurality of interconnected Ethernet switch modules according to an embodiment.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Methods and computer program products as disclosed herein may be provided on any machine-readable media for accomplishing their operations. The embodiments may be implemented using an existing computer processor, a special purpose computer processor incorporated for this or another purpose, or a hardwired system. Some embodiments as described hereinforth include computer program products that comprise non-transitory computer-readable or machine-readable media for carrying machine-executable instructions or data structures stored thereon. Such computer-readable or machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or any other machine with a processor. Machine-executable instructions comprise, for example, instructions and data, which cause a general purpose computer, special purpose computer, or special purpose processing machines to perform a certain function or group of functions.

Computer program products within the meaning of this disclosure include machine-executable instructions, such as program code, for example in the form of program modules executed by machines in networked environments. Generally, program modules include routines, programs, objects, components, data structures and similar pieces of information that perform particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

The methods as described herein may be performed in distributed computing environments where tasks are performed by local and remote processing devices that are linked (either by hardwired links, wireless links, or by a combination of hardwired or wireless links) through a communication network such as an AFDX network. In a distributed computing environment, program modules may be located in both local and remote memory storage devices.

FIG. 1 shows a schematic illustration of an Ethernet switch 9 having a plurality of interconnected Ethernet switch modules 1. The Ethernet switch 9 may be as an AFDX Ethernet switch a core part of an AFDX network. An AFDX Ethernet switch 9 is configured to perform traffic policing and filtering as well as forwarding AFDX packets towards respective destination end systems. As example, the AFDX switch 9 in FIG. 1 connects third end systems 7 as source systems to first end systems 5 and second end systems 6, respectively. The third end systems 7 may for example be line replaceable modules (LRUs) or input/output modules, while the first end systems 5 may be simulation model execution hosts and the second end systems 6 may be data display tools. However, it is to be noted that the end systems are not limited to the exemplary shown end system types 5, 6 and 7 in FIG. 1, but other types of devices the applications of which access network components to send or receive data from the AFDX network.

The AFDX switch 1 may in particular function as a hub between aircraft LRUs, simulation model execution hosts, physical signal I/O modules, data display tools, and possibly all remote links with other networks and sites. The number of Ethernet switch modules 1 shown in FIG. 1 is six, however, any other number of Ethernet switch modules 1 may be used as well. Particularly, since in a testing environment for aircraft systems all respective end systems are connectable using an AFDX switch 1, the number of Ethernet switch modules 1 will be fairly large. Thus, the whole AFDX switch will have a huge number of ports in operation. The distribution of the linking paths among a plurality of Ethernet switch modules 1 within the AFDX switch 9 will ensure high flexibility, good scalability and the ability to replicate requested AFDX forwarding patterns into forwarding resources.

Figure 2:
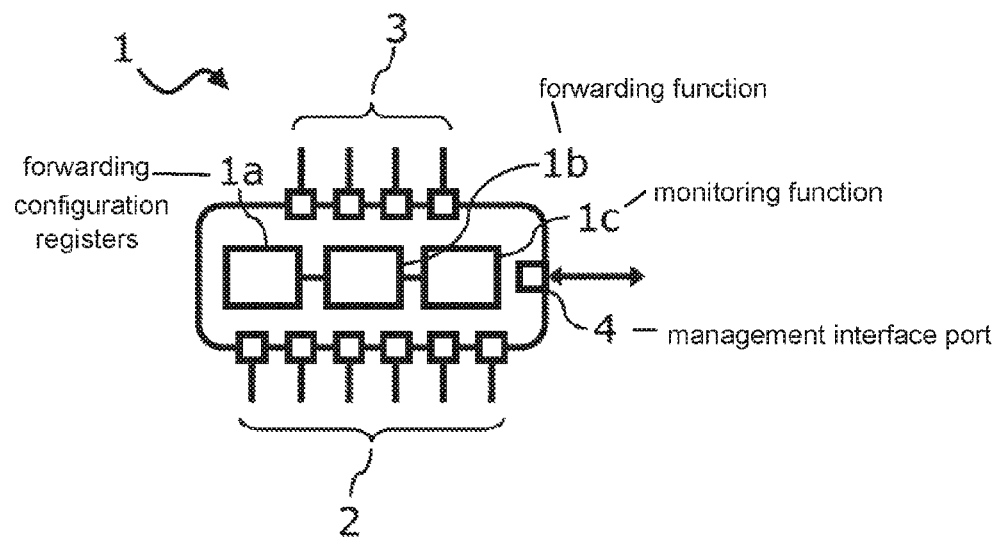
FIG. 2 schematically illustrates an Ethernet switch module for an Ethernet switch of FIG. 1.

The Ethernet switch modules 1 may be AFDX switch modules for use in an AFDX network. In the following, reference is made to AFDX switch modules without loss of generality. As depicted in FIG. 1, each AFDX switch module 1 includes a number of ingress/egress ports 2 and 3. A more detailed view of a single AFDX switch module 1 is exemplarily shown in FIG. 2.

Each AFDX switch module 1 provides ten ports in total, divided into six ingress/egress ports 2 at the front side and four ingress/egress ports 3 at the rear side. Although providing equal functionality, the ingress/egress ports labelled with the reference numeral 2 are primarily intended to connect with end systems, while the ingress/egress ports labelled with the reference numeral 3 are primarily intended to establish links with other AFDX switch modules 1. It should, however, be noted that the shown partitioning of ports 2 and 3 is merely exemplary, and that other partitions and functional assignments may be possible as well, depending on the overall network topology and requirements. With at least four ports per AFDX switch module 1 that are used for inter-module links, network topologies like a two-dimensional mesh, a hierarchical tree or any combinations therefore may be implemented.

Moreover, each AFDX switch module 1 may additionally comprise a management interface port 4. The management interface port 4 may allow for service access to the AFDX switch module 1, such as for the configuration of the forwarding rules, additional identification bits handling, and the MAC address modification settings.

The main functional component of the AFDX switch module 1 is the forwarding function 1b which implements a filtering and policing function to ensure that only valid packets received at ingress ports are forwarded to the respective egress ports. The setup of the forwarding function 1b is done using configuration data held in forwarding configuration registers 1a with pre-set forwarding tables. The AFDX switch module 1 may further comprise a monitoring function 1c which is configured to monitor and log all forwarding operations and events such as packet arrivals and discarding of invalid packets. The monitoring function 1c may further communicate with the network management with respect to operational and health related information of the AFDX switch module 1.

Returning to FIG. 1, the AFDX switch 9 establishes physical links between all end systems 5, 6 and 7 connected to the switch. The AFDX switch 9 is capable of forwarding data packets from any connected end system to one or more other end systems connected to the AFDX switch 9. The forwarding patterns will be determined by the switch configuration that establishes the VLs between end systems 5, 6 and 7. Based on its configuration, the AFDX switch 9 may also police that the bandwidth allocated to each VL is not exceeded. If the AFDX switch 9 detects that the bandwidth of a VL is exceeded, data is discarded and not forwarded until the bandwidth returns to its specified limits again.

Figure 3:
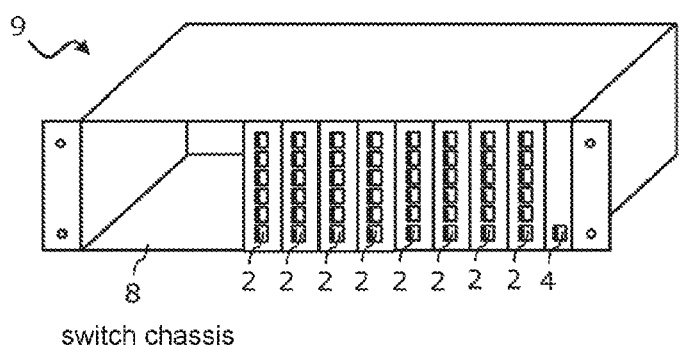
FIG. 3 schematically illustrates an exemplary chassis for an Ethernet switch according to another embodiment.

The AFDX switch 9 of FIG. 1 may for example be installed in a switch chassis 8, as exemplarily illustrated in FIG. 3. For example, a 3U 19-inch chassis may take up sixteen AFDX switch modules 1 side by side, leaving additional room for a management host module with a management interface port 4. With sixteen AFDX switch modules 1 having six ingress/egress ports 2 at their front sides each, a total of 96 ports per chassis 8 may be obtained. The additional four ingress/egress ports 3 on the rear side may then be used to establish inter-module connections between the AFDX switch modules 1 by plugging of patch cables, encapsulated within the chassis 8 and thus protected from accidental or abusive access.

The forwarding function 1b as central feature of an AFDX switch module 1 establishes forwarding pattern according to the VLs predefined in the AFDX network. AFDX packets consist of multicast-addressed IP packets encapsulated in Ethernet packets. VLs are identified in AFDX packets using a VLID which is encoded in the two least significant bytes of the media access control (MAC, also known as Ethernet hardware address (EHA)) destination address field of an Ethernet packet. The forwarding functions 1b are configured to forward an incoming packet from one end system 5, 6, 7 to a predetermined set of end systems 5, 6, 7, by matching the combination of the VLID read out from the packet together with the information through which of its ingress ports the packet was received with a configured forwarding rule found in the forwarding table. Thus, distinct forwarding patterns between certain ingress/egress ports 2 for AFDX packets carrying the same VLID can be established. This may conveniently be done by not only considering the VLIDs but also the identity of the ingress port 2 at which the packet has been received.

By modifying the source or destination MAC address field of AFDX packets, which among other data contains information on the AFDX network belonging in redundant AFDX network architectures (AFDX network ID), the AFDX switch has the options both to replicate non-redundant AFDX packets into two adapted packets carrying the correct network assignments for use in redundant networks as well as to multiplex packets received from two redundant networks onto one single non-redundant network. Such a procedure saves implementation costs on simulation model execution hosts, input/output modules and/or data display tools as they only need to provide one Ethernet physical link with the AFDX switch and still will be able to send packets to end systems that expect packet delivery from a redundant network.

To be able to establish several distinct forwarding patterns using the same physical port and wire connection for packets having the same VLID, the AFDX packets may be tagged with additional identification information to which pattern they belong. This may be done by using unassigned bits in the MAC destination address field of the Ethernet packet. Since the MAC destination address field of the Ethernet packet uses only the two least significant bytes for encoding the VLID as a 16-bit unsigned integer value, the previous four bytes are encoded as a constant 32-bit field with a constant value. For conventional AFDX packets, this value is "0000 0011 0000 0000 0000 0000 0000 0000." Similarly, the MAC source address field of the Ethernet packet uses unassigned bits of constant value, for example in the identification field of the network ID or a constant field value in the three most significant bits.

When establishing distinct forwarding patterns, a number of unassigned bits within the destination MAC address field or the source MAC address field may be used to encode additional identification information which will be subsequently usable by the forwarding function 1b. This may be done by the AFDX switch module 1 at which the AFDX packet was first received. The AFDX packet is then routed through the AFDX switch 9 according to the VLID and the additional identification information. When passing through an egress port of the AFDX switch 9, the last AFDX switch module 1 may reset the respectively altered bits back to the unassigned default value, for example zero, as expected by normal end systems. Hence, the AFDX switch 9 will provide functionality to modify and to re-establish the original bits of the destination or source MAC address fields. By using the temporarily altered MAC address field values, distinct forwarding patterns for the same VLID may be established. AFDX packets with the same VLID but tagged in that way are able to commonly traverse over the same link between two consecutive AFDX switch modules 1, but may be distinguished by their additional identification information and get different forwarding patterns applied. When finally leaving the AFDX switch 9, resetting the temporarily altered bit positions to the original value ensures that only standard-compliant packets will leave the AFDX switch 9.

The modification of the packet headers of the Ethernet packet may be performed by the respective forwarding functions 1b of the Ethernet switch modules 1. When an Ethernet packet is received at a respective ingress port 2, the receiving forwarding function 1b may encode the identity of the ingress port 2 at which the respective Ethernet frame has been received in identification bits of the packet header, such as identification bits in the destination MAC address field of the source MAC address field.

FIG. 4 exemplarily illustrates a method 10 for establishing forwarding patterns in an Ethernet switch such as the Ethernet switch 9 of FIG. 1, in particular for AFDX virtual link packet forwarding. The method 10 may comprise at 11 receiving an Ethernet packet from an end system at an ingress port 2 of one of a plurality of Ethernet switch modules 1 making up the Ethernet switch 9. At 12, an ingress port identifier is generated that depends on the ingress port 2 at which the Ethernet frame has been received.

At 13, the method 10 may comprise modifying a packet header of the received Ethernet packet by encoding the ingress port identifier of the ingress port at which the Ethernet packet has been received in identification bits of the packet header, for example by modifying a destination MAC destination address field or a source MAC source address field of an AFDX packet. This additional identification information is dependent on the VLID of the received packet and the ingress port 2 at which the packet has been received. The additional identification information is configurable through the management interface port 4.

At 14, the received Ethernet packet is forwarded through the Ethernet switch 9, for example dependent on a virtual link identifier of an AFDX virtual link which the respective AFDX packet belongs to and an additional identification information, both included in the packet header of the AFDX packet. Finally, before the Ethernet packet leaves the Ethernet switch 9 again through one of the egress ports of one of the plurality of Ethernet switch modules, the modified packet header may be reset to the original content of the received Ethernet packet and/or the network ID of the AFDX packet may be changed at 15. This may for example be done by resetting the additional identification bits of the packet header to the original values of the received AFDX packet, by writing the respective network ID codes into the source MAC address and by re-calculating the CRC check sum of the Ethernet packet, before the AFDX packet is output at an egress port 2.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. An Avionics Full-Duplex Switched Ethernet switch, comprising at least two interconnected Avionics Full-Duplex Switched Ethernet switch modules, with each of the Avionics Full-Duplex Switched Ethernet switch modules comprising:
   a number of ingress/egress ports configured to receive or output Avionics Full-Duplex Switched Ethernet packets from and to end systems and interconnected Avionics Full-Duplex Switched Ethernet switch modules, wherein the end systems comprise test system components and original equipment units under test, and wherein the Avionics Full-Duplex Switched Ethernet packets each comprise a virtual link identifier of an Avionics Full-Duplex Switched Ethernet virtual link which the respective Avionics Full-Duplex Switched Ethernet packet belongs to; and
   a forwarding function configured to modify a Media Access Control destination address field or a Media Access Control source address field of a packet header of received Avionics Full-Duplex Switched Ethernet packets by encoding identity of the ingress port at which the respective Avionics Full-Duplex Switched Ethernet packet has been received in identification bits of the Media Access Control destination address field or Media Access Control source address field of the packet header and forward the received Avionics Full-Duplex Switched Ethernet packets through the Avionics Full-Duplex Switched Ethernet switch based on the virtual link identifier and the identity of the ingress port;
   wherein the identity of the ingress port is used by the forwarding function to distinguish between the test system components and the original equipment units under test for the same virtual link identifier.

2. The Avionics Full-Duplex Switched Ethernet switch according to claim 1, wherein the forwarding function is further configured to reset the identification bits of the packet header to original values of the received Avionics Full-Duplex Switched Ethernet packets, when the Avionics Full-Duplex Switched Ethernet packets are output at an egress port.

3. The Avionics Full-Duplex Switched Ethernet switch according to claim 1, wherein the packet header of the Avionics Full-Duplex Switched Ethernet packets comprises the virtual link identifier of the Avionics Full-Duplex Switched Ethernet virtual link which the respective Avionics Full-Duplex Switched Ethernet packet belongs to.

4. The Avionics Full-Duplex Switched Ethernet switch according to claim 1, wherein the original equipment units under test comprise line replaceable units.

5. A method for establishing forwarding patterns in an Avionics Full-Duplex Switched Ethernet switch, the Avionics Full-Duplex Switched Ethernet switch comprising at least two interconnected Avionics Full-Duplex Switched Ethernet switch modules, and the method comprising:
   receiving Avionics Full-Duplex Switched Ethernet packets from end systems at a number of ingress ports of one of the Avionics Full-Duplex Switched Ethernet switch modules, wherein the end systems comprise test system components and original equipment units under test, and wherein the Avionics Full-Duplex Switched Ethernet packets each comprise a virtual link identifier of an Avionics Full-Duplex Switched Ethernet virtual link which the respective Avionics Full-Duplex Switched Ethernet packet belongs to;
   generating an ingress port identifier depending on the ingress port at which the respective Avionics Full-Duplex Switched Ethernet packet has been received;
   modifying a Media Access Control destination address field or a Media Access Control source address field of a packet header of the received Avionics Full-Duplex Switched Ethernet packets by encoding the ingress port identifier of the ingress port at which the respective Avionics Full-Duplex Switched Ethernet packet has been received in identification bits of the Media Access Control destination address field or Media Access Control source address field of the packet header;
   forwarding the received Avionics Full-Duplex Switched Ethernet packets through the Avionics Full-Duplex Switched Ethernet switch based on the virtual link identifier and the ingress port identifier of the ingress port; and
   resetting the modified packet header to the original content of the received Avionics Full-Duplex Switched Ethernet packets upon outputting the received Avionics Full-Duplex Switched Ethernet packets at an egress port of the one of the Avionics Full-Duplex Switched Ethernet switch modules;
   wherein the ingress port identifier of the ingress port is used in said forwarding to distinguish between the test system components and the original equipment units under test for the same virtual link identifier.

6. The method according to claim 5, wherein resetting the modified packet header comprises resetting the identification bits of the packet header to original values of the received Avionics Full-Duplex Switched Ethernet packets, before the Avionics Full-Duplex Switched Ethernet packets are output at the egress port.

7. The method according to claim 5, wherein forwarding the received Avionics Full-Duplex Switched Ethernet packets through the Avionics Full-Duplex Switched Ethernet switch is dependent on the virtual link identifier of the Avionics Full-Duplex Switched Ethernet virtual link which the respective Avionics Full-Duplex Switched Ethernet packet belongs to which the virtual link identifier is included in the packet header of the Avionics Full-Duplex Switched Ethernet packets, the number of ingress ports through which the Avionics Full-Duplex Switched Ethernet packets were received, and a value of the identification bits in the packet header.

8. A non-transitory computer-readable medium comprising computer-readable instructions which, when executed on a computer, cause the computer to perform a method for establishing forwarding patterns in an Avionics Full-Duplex Switched Ethernet switch, the Avionics Full-Duplex Switched Ethernet switch comprising at least two interconnected Avionics Full-Duplex Switched Ethernet switch modules, and the method comprising:
   receiving Avionics Full-Duplex Switched Ethernet packets from end systems at a number of ingress ports of one of the Avionics Full-Duplex Switched Ethernet switch modules, wherein the end systems comprise test system components and original equipment units under test, and wherein the Avionics Full-Duplex Switched Ethernet packets each comprise a virtual link identifier of an Avionics Full-Duplex Switched Ethernet virtual link which the respective Avionics Full-Duplex Switched Ethernet packet belongs to;
   generating an ingress port identifier depending on the ingress port at which the respective Avionics Full-Duplex Switched Ethernet packet has been received;

modifying a Media Access Control destination address field or a Media Access Control source address field of a packet header of the received Avionics Full-Duplex Switched Ethernet packets by encoding the ingress port identifier of the ingress port at which the respective Avionics Full-Duplex Switched Ethernet packet has been received in identification bits of the Media Access Control destination address field or Media Access Control source address field of the packet header;

forwarding the received Avionics Full-Duplex Switched Ethernet packets through the Avionics Full-Duplex Switched Ethernet switch based on the virtual link identifier and the ingress port identifier of the ingress port; and resetting the modified packet header to the original content of the received Avionics Full-Duplex Switched Ethernet packets upon outputting the received Avionics Full-Duplex Switched Ethernet packets at an egress port of the one of the Avionics Full-Duplex Switched Ethernet switch modules;

wherein the ingress port identifier of the ingress port is used in said forwarding to distinguish between the test system components and the original equipment units under test for the same virtual link identifier.

\* \* \* \* \*